US005416496A

United States Patent [19]

Wood

[11] Patent Number: 5,416,496

[45] Date of Patent: May 16, 1995

[54] FERROELECTRIC LIQUID CRYSTAL DISPLAY APPARATUS AND METHOD

[76] Inventor: Lawson A. Wood, 905 N. Frederick St., Arlington, Va. 22205

[21] Appl. No.: 34,694

[22] Filed: Mar. 19, 1993

Related U.S. Application Data

[63] Continuation-in-part of Ser. No. 862,313, Apr. 2, 1992, abandoned, which is a continuation-in-part of Ser. No. 521,399, May 10, 1990, Pat. No. 5,128,782, which is a continuation-in-part of Ser. No. 396,916, Aug. 22, 1989, abandoned.

[51] Int. Cl.[6] .............................................. G09G 3/36

[52] U.S. Cl. ...................................... 345/102; 345/88

[58] Field of Search ............... 340/784, 793, 703, 765, 340/767; 359/54, 55, 56, 48, 50; 345/89, 88, 87, 99, 102, 147, 148, 153, 155

[56] References Cited

U.S. PATENT DOCUMENTS

| | | | |
|---|---|---|---|
| 4,383,256 | 5/1983 | Kurahashi et al. | 340/793 |
| 4,752,771 | 6/1988 | Katogi et al. | 340/793 |
| 4,769,713 | 9/1988 | Yasui | 340/793 |
| 5,122,791 | 6/1992 | Gibbons et al. | 340/793 |
| 5,122,793 | 6/1992 | Stewart | 340/793 |
| 5,162,786 | 11/1992 | Fukuda | 340/793 |
| 5,189,407 | 2/1993 | Mano et al. | 340/793 |

*Primary Examiner*—Ulysses Weldon
*Assistant Examiner*—Xiao M. Wu
*Attorney, Agent, or Firm*—Steven M. Rabin

[57] ABSTRACT

A liquid crystal display apparatus includes a ferroelectric LCD panel and a backlighting unit which emits flashes of red light, flashes of green light, and flashes of blue light. The pixels of the LCD panel are turned on in accordance with the most significant bits of the red component of an image, and a red flash is emitted at a first level. Then all of the pixels are turned off. Pixels are turned on again in accordance with the second-most significant bit of the red component of the image, and then the red light is flashed at a level which is half that of the preceding flash. This procedure continues bit-by-bit until the pixels are turned on in accordance with the least significant bit of the red component of the image and the red light is flashed at a level commensurate with the least significant bit. Then the blue and green component of the frame are displayed in the same way. In another embodiment, the intensity of red, green, and blue fluorescent tubes behind a ferroelectric LCD panel is controlled as pixels are being turned on and off. The rate at which they are turned on and off may also be controlled to provide different intensity levels.

29 Claims, 3 Drawing Sheets

FIG. 1
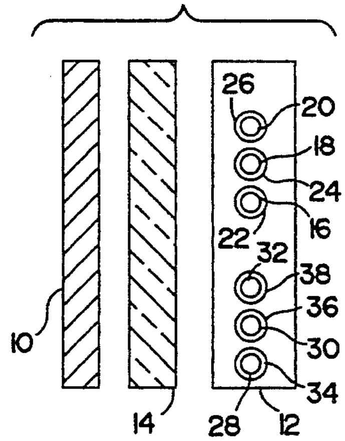
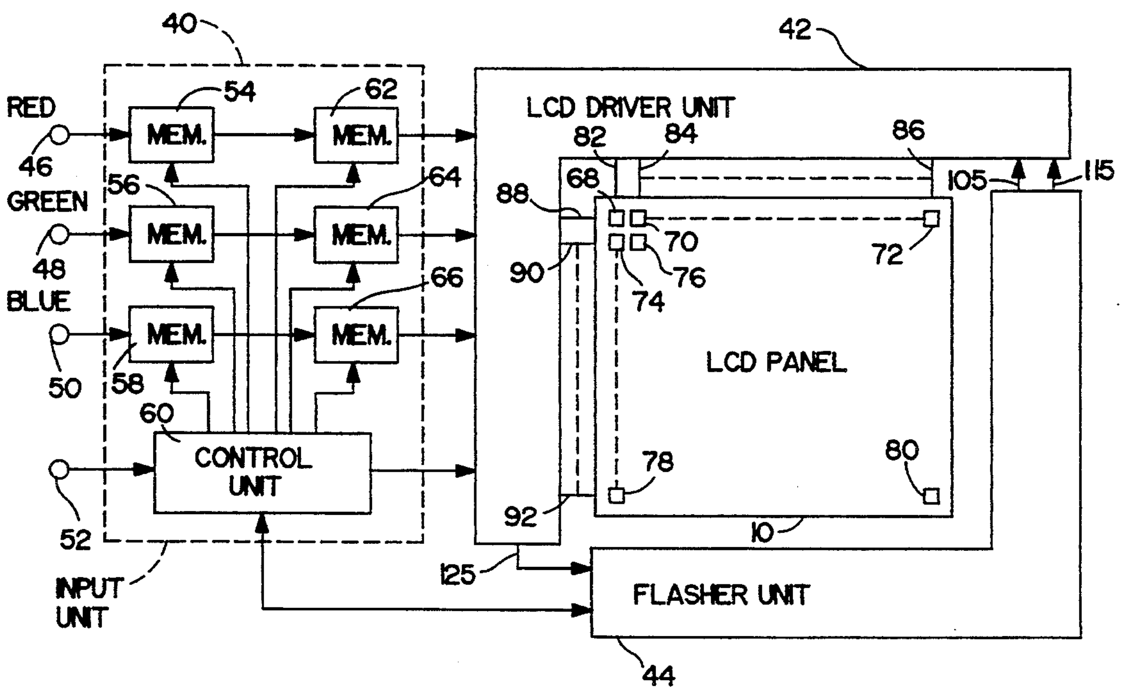
FIG. 2

FERROELECTRIC LIQUID CRYSTAL DISPLAY APPARATUS AND METHOD

CROSS-REFERENCE TO RELATED APPLICATIONS

This application is a continuation-in-part of application Ser. No. 07/862,313, filed Apr. 2nd, 1992, now abandoned, which was a continuation-in-part of application Ser. No. 07/521,399, filed May 10th, 1990, which was a continuation-in-part of application Ser. No. 07/396,916, filed Aug. 22nd, 1989. Application Ser. No. 07/521,399 matured into U.S. Pat. No. 5,128,782, issued Jul. 7th, 1992; application Ser. No. 07/396,916 is abandoned.

BACKGROUND OF THE INVENTION

The present invention is directed to a ferroelectric liquid crystal display apparatus and to a method for displaying an image using a back-lighted ferroelectric liquid crystal display panel.

A liquid crystal is an organic fluid which, despite being a fluid, has molecules which spontaneously assume an ordered configuration. This configuration can be altered by applying an electric field, and the resulting change in the configuration of the molecules can be used to control light passing through the liquid crystal. The liquid crystal is sandwiched between two polarizers having transparent electrodes made, for example, from metal oxide film. The polarization axis of light passing through the first polarizer is rotated by the liquid crystal if no voltage is applied between the electrodes, and the rotation disappears when a suitable voltage is applied. As a result, light passing through the first polarizer and the liquid crystal may or may not pass through the second polarizer, depending upon the applied voltage and hence the polarization axis of the light when it reaches the second polarizer.

A matrix of liquid crystal cells can be used in a liquid crystal display panel to display a sequence of frames of video information. A ferroelectric LCD panel has cells with very short turn-on and turn-off times. These cells are bistable; once a cell is turned on it remains on until it is turned off. One problem with prior art ferroelectric liquid crystal display apparatuses is that a satisfactory gray scale is difficult to achieve due to the bistable nature of the cells.

SUMMARY OF THE INVENTION

An object of the invention is to provide a ferroelectric liquid crystal display method and apparatus having an improved gray scale performance.

Another object is to provide a method in which the light transmitted through the pixels of a ferroelectric LCD panel is controlled not by how long the pixels are on, but by flashing a backlighting unit at different binary levels while they are on. The pixels of the LCD panel are selectively turned on in response to video information in order to determine which of these flashes reach the eyes of a viewer.

Another object of the invention is to provide a method in which a backlighting unit emits a sequence of red flashes at different binary levels when the red component of an image is displayed on a ferroelectric LCD panel, a sequence of green flashes at different binary levels when the green component of the image is displayed on the panel, and a sequence of blue flashes at different binary levels when the blue component of the image is displayed.

Another object is to provide a method in which the light transmitted through the pixel of a ferroelectric LCD panel is controlled by turning on pixels in accordance with bits of a particular rank or significance of video data words (hereafter occasionally referred to as simply "video words") which correspond to the pixels, turning these bits off, and exposing the back side of the panel to light while the pixels are being turned on and off, the light having an intensity that depends on the rank of the bits of the video words.

Another object is to provide a method in which the light transmitted through the pixels of a ferroelectric LCD panel is controlled by turning on pixels in accordance with bits of a first rank of video words which correspond to the pixels, turning these bits off, turning the pixels on in accordance with bits of a second rank, turning these bits off, and exposing the back side of the panel to light having a constant intensity while the pixels are being turned on and off, the time for turning the pixels on and off in accordance with the bits of the first rank being different from the time for turning the pixels on and off in accordance with the bits of the second rank.

These and other objects which will become apparent in the ensuing detailed description can be attained, in a method of displaying a sequence of frames with video information on a ferroelectric LCD panel having a matrix of pixels, the video information for a frame including a plurality of multi-bit video words which correspond to the pixels, each video word including at least a first bit and a second bit, by:

(a) turning on the pixels which correspond to video words whose first bit has a predetermined value;
(b) turning off the pixels that were turned on during step (a);
(c) turning on the pixels which correspond to video words whose second bit has the predetermined value; and
(d) turning off the pixels that were turned on during step (c).

In accordance with one aspect of the invention, a light behind the panel is flashed at first level after step (a), and the light is flashed at a second level after step (c). The result is as follows: Pixels are turned on and off in accordance with the value of bits of video words which provide video information for display at corresponding pixels of the ferroelectric LCD panel. Each time pixels are turned on, a backlighting unit emits a flash with a quantity of light which corresponds to the rank or significance of the bits. The quantity of light emitted during a flash when the pixels are turned on in accordance with the most significant bits is double the quantity of light emitted during a flash when the pixels are turned on in accordance with the second-most significant bits, and so-on for lower order bits. Colored images can be shown by using primary-color filters for the individual pixels. However, a color display is preferably achieved by using flashing lights of different primary colors, so that each pixel can display a desired hue instead of a group of three pixels being needed.

In accordance with another aspect of the invention, the back side of the panel is exposed to light having a first intensity while steps (a) and (b) are being conducted and to light having a second intensity while steps (c) and (d) are being conducted. The light may be emitted steadily during these exposures, meaning that it shines for a period of time that is substantially longer than a flash. In this application, "steady" emission of light during a period includes light that is emitted throughout the period even if the light is periodically interrupted during duty cycle control of the intensity of the illumination. Instead of steady emission while steps (a) and (b) are conducted and steady emission at a different intensity level while steps (c) and (d) are conducted, the different intensities may be obtained by turning the backlighting on for a different number of periods when steps (a) and (b) are conducted than when steps (c) and (d) are conducted.

In accordance with another aspect of the invention, the back side of the panel is exposed to light having the same intensity while steps (a) through (d) are conducted, but the time for conducting steps (a) and (b) is different from the time for conducting steps (c) and (d).

BRIEF DESCRIPTION OF THE DRAWINGS

FIG. 1 is a sectional view illustrating a ferroelectric liquid crystal display panel and a backlighting unit with a diffusion plate between them;

FIG. 2 is a block diagram schematically illustrating a ferroelectric liquid crystal display apparatus in accordance with one embodiment of the present invention;

DESCRIPTION OF THE PREFERRED EMBODIMENTS

Figure 3:
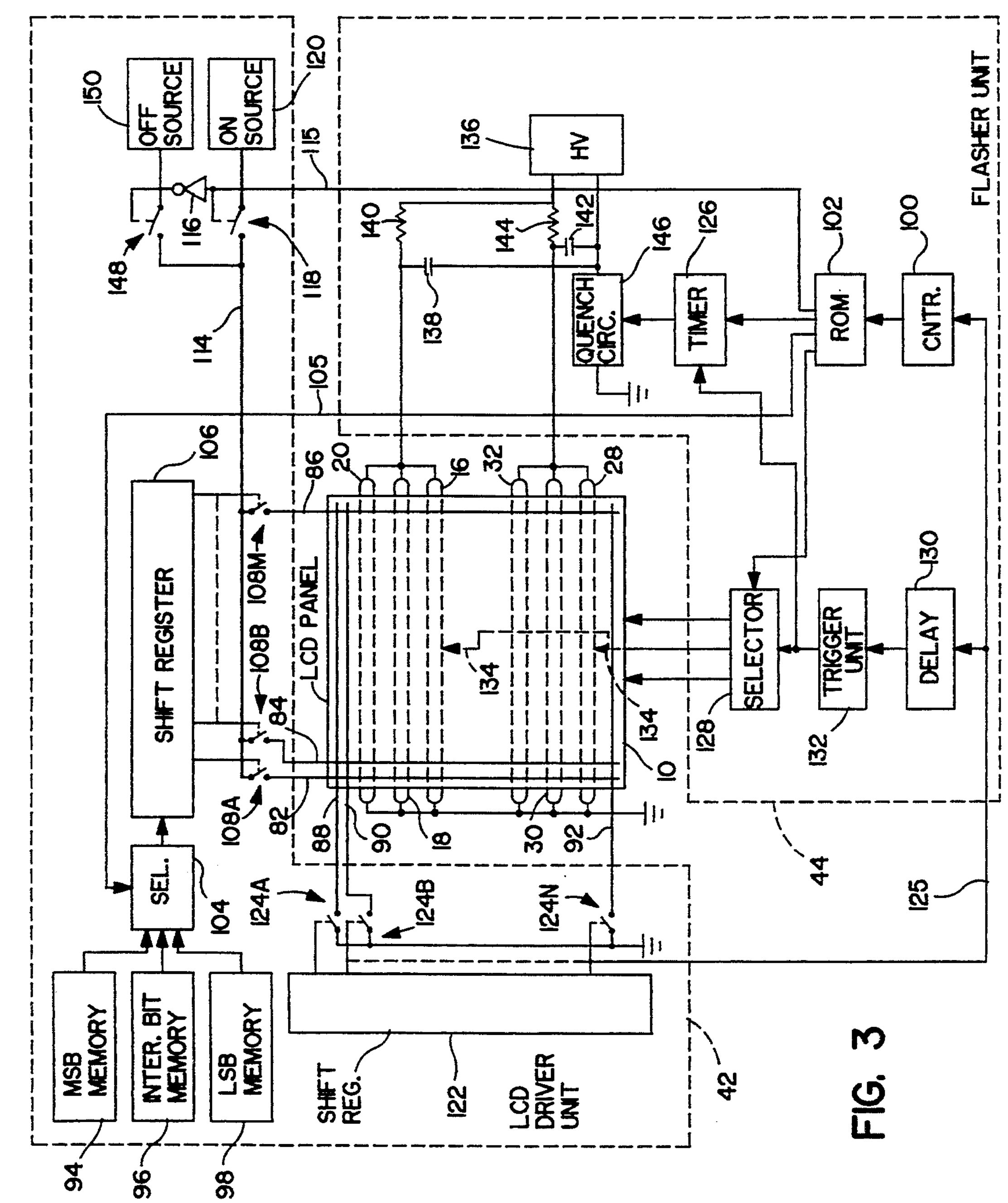
FIG. 3 is a block diagram showing details of the LCD driver unit and flasher unit shown in FIG. 2.

In FIG. 1, reference number 10 designates a ferroelectric liquid crystal display panel. A backlighting unit 12 is disposed behind panel 10, and a diffusion plate 14 is positioned between backlighting unit 12 and panel 10 to diffuse the light emitted by unit 10 so that it falls uniformly on the back of panel 10. Backlighting unit 12 includes a top group of flash tubes 16, 18, and 20, which are surrounded respectively by a red filter 22, a green filter 24, and a blue filter 26. Flash tubes 28, 30, and 32 of a bottom group are surrounded respectively by a red filter 34, a green filter 36, and a blue filter 38. In view of the colored filters, flash tubes 16 and 28 will occasionally be called "red flash tubes," flash tubes 18 and 30 will occasionally be called "green flash tubes," and flash tubes 20 and 32 will occasionally be called "blue flash tubes." As will be discussed in more detail below, flash tubes of the same color in each group are flashed simultaneously to bathe the back of panel 10 with red, green, or blue light.

Turning next to FIG. 2, a liquid crystal display apparatus in accordance with the present invention also includes an input unit 40, an LCD driver unit 42, and a flasher unit 44. The input unit 40 has an input terminal 46 for receiving a digitalized signal for the red component of an image, an input terminal 48 for receiving a digitalized signal for the green component, an input terminal 50 for receiving a digitalized signal for the blue component, and an input terminal 52 for receiving a synchronization signal. The digitalized signals for the red, green, and blue components consist of three-bit video data words (hereafter usually referred to as simply "video words"), so that each video word specifies one of eight levels of red, green, or blue intensity for a corresponding pixel that is to be displayed on LCD panel 10. The video words for the red, green, and blue components are stored in respective frame memories 54, 56, and 58 under the control of a control unit 60. When a full frame is stored, control unit 60 transfers the contents of memories 54–58 to further frame memories 62, 64, and 66 and then begins storing the next frame in memories 54–58. Control unit 60 also reads out the contents of memories 62–66 to the LCD driver unit 42.

Panel 10 has row electrodes and column electrodes (not illustrated in FIG. 2) which cross (with liquid crystal material between them) to provide a matrix of pixels having N rows and M columns. FIG. 2 illustrates some of these pixels, designated by reference numbers 68–80. Reference number 68 identifies the pixel at the first row and first column of the matrix, reference number 70 identifies the pixel at the first row and second column of the matrix, reference number 72 designates the pixel at the first row and M-th column of the matrix, and the dotted line illustrated between pixels 70 and 72 is intended to indicate that many additional pixels are present in the first row. Pixel 74 is disposed at the second row and first column of the matrix, pixel 76 is disposed at the second row and second column of the matrix, and so forth. Pixel 78 is disposed at the N-th row and first column of the matrix and pixel 80 is disposed at the N-th row and M-th column. The dotted line between pixels 74 and 78 is intended to indicate that many more rows of pixels are present than are shown in the drawing.

An overview of the operation of the first embodiment of a liquid crystal display apparatus in accordance with the invention will now be presented. First, control unit 60 transfers the content of memory 62 to LCD driver unit 42. This represents the video information for the red component of a frame, in three-bit video data words. Each of these video words designates the intensity of the red component of the image at a corresponding one of the pixels of panel 10. If the most significant bit of the video word for the first pixel in the first row (that is, pixel 68) is "1," driver unit 42 places a voltage V-on on a column conductor 82 that is connected to the first column electrode (not illustrated in FIG. 2) of panel 2; if the most significant bit is zero, column conductor 82 is left floating. Similarly, if the most significant bit of the video word corresponding to pixel 70 is "1," V-on is placed on column conductor 84, and if the most significant bit is "0" then conductor 84 has a floating potential. This continues for other column conductors (not specifically shown, but schematically indicated by a dotted line) to the last column conductor 86. Furthermore driver unit 42 grounds a row conductor 88, whereupon the pixels of the first row which correspond to video words whose most significant bit is "1" become transmissive (hereafter occasionally known as "turned on").

Then driver unit 42 brings row conductor 88 to a floating potential and repeats the procedure for the second row of pixels. That is, V-on is placed on column conductor 82 if the most significant bit of the word corresponding to the first pixel of the second row (that is, pixel 74) is "1" and otherwise column conductor 82 is brought to a floating potential, and so forth. Driver unit 42 brings all of the column conductors to either V-on or a floating potential, and a row conductor 90 is grounded to turn the appropriate pixels of the second row on. This continues row-by-row until finally a last row conductor 92 is grounded to turn the appropriate pixels of the N-th row on. Flasher unit 44 then fires red flash tubes 16 and 28, which emit a predetermined quantity of light.

Then unit 42 turns all of the pixels of panel 10 off. Next, the pixels of the panel are turned on in accordance with the second-most or intermediate significant bits of the words corresponding to the pixels. That is, driver unit 42 places V-on on column conductor 82 if the intermediate significant bit of the word corresponding to pixel 68 is "1" and otherwise places a floating potential on conductor 82. Driver unit 42 brings all of the column conductors to either V-on or a floating potential, and row conductor 88 is grounded to turn the appropriate pixels of the first row on. After all of the pixels corresponding to video words whose intermediate significant bit is 1 have been turned on, flasher unit 44 fires red flash tubes 16 and 28 at a reduced level. The total quantity of the light emitted during this flash is half the total quantity emitted during the flash when the pixels were turned on in accordance with the most significant bits. To complete the display of the red component of the frame, pixels corresponding to video words whose least significant bit is "1" are turned on, and flasher unit 44 fires red flash tubes 16 and 28 at a further reduced level in which the total amount of the light emitted is one-fourth of the total amount emitted during the first flash and half the total amount emitted during the second flash. It will be apparent that the total amount of light emitted through each pixel during these three flashes corresponds to the binary value of the corresponding digital word.

After the red component has been displayed as discussed above, the green and blue components of the frame are also displayed. Three flashes of green light at different levels are used when the green component is displayed and, similarly, three flashes of blue light at different levels are used when the blue component is displayed. The liquid crystal display apparatus is now ready to proceed to the next video frame.

Turning next to FIG. 3, LCD driver unit 42 includes a most significant bit memory 94, a second-most or intermediate bit memory 96, and a least significant bit memory 98. After the red, green, and blue components of one frame have been displayed and it is time to begin again with the red component of the next frame, control unit 60 transfers the video words from memory 62 to memories 94–98, with the most significant bits being stored in memory 94, the intermediate bits being stored in memory 96, and the least significant bits being stored in memory 98. Control unit 60 also resets a counter 100 in flasher unit 44 to 00000. Counter 100 provides an address signal for a ROM 102, which stores display control words, as will be discussed in more detail later. Each display control word includes a bit selection portion which is applied to a data selector 104. The bit selection portion of the display control word has two bits, which are supplied to LCD driver unit 42 through conductors 105. The bit selection portion of the display control word read out of ROM 102 when the address is 00000 causes selector 104 to select the output of most significant bit memory 94.

The video words for the first row of the red component of the image are read out of memories 94–98 by control unit 60, and selector 104 passes the most significant bits of the first row to a column shift register 106. Shift register 106 has M stages and an output for every stage, although only three outputs (for the first stage, second stage and M-th stage) are shown. The dotted line illustrated in FIG. 3 beneath shift register 106 is intended to indicate that the shift register has far more outputs than are specifically shown.

Each of the outputs of shift register 106 is associated with a corresponding electrically controlled switch. Although only switches 108A, 108B, and 108M are shown in FIG. 3, it will be apparent that far more are present, each controlled by the output of a corresponding stage of shift register 106. When they are closed, these switches connect the column conductors (including conductors 82, 84, and 86) to a conductor 114, and when they are open, the column conductors are left in an electrically floating state.

Each display control word stored in ROM 102 also includes a one-bit on/off selection portion. When the address signal to ROM 102 is 00000, the on/off selection portion is "1". This is supplied to LCD driver unit 42 via a conductor 115 and causes an electrically controlled switch 118 to close, thus connecting conductor 114 to an ON voltage source 20, which provides a voltage V′-on.

LCD driver unit 42 also includes a row shift register 122 having N stages (that is, a stage for every row of panel 10) and an output for every stage. Although only three of these outputs are shown in FIG. 3, the dotted line adjacent shift register 122 is intended to indicate that many more outputs are present. Each output is associated with a corresponding electrically controlled switch, although only switches 124A, 124B, and 124N are illustrated in FIG. 3. These switches connect the row conductors (e.g., 88, 90, and 92) to ground when they are closed and leave the row conductors in an electrically floating state when they are open.

When control unit 60 begins shifting the first row of bits into column shift register 106, it also begins shifting a "1" through row shift register 122. This "1" first causes switch 124A to close, grounding row conductor 88. Bits are preferably shifted into column shift register 106 very rapidly, so the pixels of the first row of panel 10 do not respond as shift register 106 is being loaded (a latch circuit may be used between shift register 106 and the switches 108 if a slower shifting speed is used in order to isolate the pixels from the values in the corresponding shift register stages until the shift register is fully loaded). Switch 124A is kept closed, after the loading of shift register 106 has been completed, for at least the turn-on time of the ferroelectric liquid crystal cells. It is desirable to keep switch 124A closed for an additional "safety" period to ensure proper operation in the event that the turn-on time varies due to factors such as manufacturing tolerances, age, temperature, and so forth. After the turn-on time and the safety period have elapsed, control unit 60 causes shift register 122 to pass the "1" to the next stage, thus closing switch 124B and opening switch 124A. The pixels turned on while switch 124A was closed remain on.

When switch 124B closed, control unit 60 simultaneously begins reading the video words for the second row of the red component of the image out of memories 94–98, and selector 104 transfers the most significant bits for the second row to column shift register 106. Column switches 108 corresponding to stages which store a "1" are closed, thus connecting the column conductors (82, 84, and so forth) to ON source 120. After the turn-on time and safety period have elapsed, control unit 60 shifts the "1" in shift register 122 to the next stage, and additionally the third row of most significant bits is transferred to column shift register 106. This procedure continues for all the rows until finally switch 124N is closed while the most significant bits for the last row of the red component of the image are transferred to column shift register 106. At this point, the pixels of panel 10 that are turned on are those which correspond to video words for the red component of the image whose most significant bit is "1."

When the "1" in row shift register 122 is shifted to the last stage, counter 100 is incremented via a conductor 125 and the address signal to ROM 102 becomes 00001. The bit selection portion and the on/off selection portion of the display control words stored in ROM 102 have already been described. The display control words also include a multi-bit light level portion and a two-bit color selection portion. The light level portion is transferred to a timer 126 and the color selection portion is transferred to a selector 128. The color selection portion of the display control words stored at address 00001 signals selector 128 to select red flash tubes 20 and 32, and the light level portion indicates how long these flashes by these flash tubes should be.

When counter 100 is incremented, a delay circuit 130 also receives the signal from the last stage of row shift register 122. Delay circuit 132 delays the signal by at least the turn-on time and safety margin before supplying it to a trigger unit 132, which emits a trigger signal. Selector 128 forwards the trigger signal to the trigger terminals 134 red flash tubes 20 and 32, which then fire. It will be apparent that selector 128 is also connected to trigger terminals of green flash tubes 18 and 30 and to trigger terminals of blue flash tubes 16 and 28, although this is not illustrated in FIG. 3. If the color selection portion of the display control word has a value that does not designate either the red, green, or blue flash tubes, the trigger signal goes no further than selector 128.

A high voltage power supply 136 is included in flasher unit 44 to charge a capacitor 138 through a resistor 140 and to charge a capacitor 142 through a resistor 144. When the trigger signal is supplied to trigger terminals 134 of the red flash tubes, capacitor 138 discharges through flash tube 16 and capacitor 142 discharges through flash tube 28. The trigger signal from trigger unit 132 is also supplied to timer 126, which permits a quenching circuit 146 to conduct for a period of time determined by the light level portion of the display control word. Each of red flash tubes 20 and 32 begins to emit a brilliant flash of red light when it receives the trigger signal, and these flashes continue until terminated by the quenching circuit 146 in accordance with the light level portion of the display control word. During these flashes, the red flash tubes 20 and 32 emit a predetermined total quantity of red light. When timer 126 times out, in addition to discontinuing the red flash, timer 126 also emits a signal to control unit 60 to indicate that the most significant bits of the red component of the frame have been displayed.

The bit selection portion of the display control word stored in ROM 102 at address 00001 causes selector 104 to select most significant bit memory 94 again. However, the on/off selection portion is "0," which is changed to "1" by an inverter 116. This causes a switch 148 to close and thereby connects an OFF voltage source 150 to conductor 114. OFF voltage source 150 provides a voltage V-off. Control unit 60 shifts another "1" into the first stage of row shift register 122 and transfers the most significant bits for the first row into column shift register 106. As a result, the previously-on pixels of the first row are turned off. After the first row of pixels is turned off, control unit 60 causes the "1" in row shift register 122 to pass to the next stage and also causes the most significant bits for the second row to be transferred to column shift register 106. This procedure continues until all of the pixels of panel 10 are off. Counter 100 is incremented when the last row is turned off and now supplies the address signal 00010 to ROM 102. The color selection portion of the display control words stored at this address causes selector 128 to select none of the flash tubes, so there is no flash. However, the trigger signal is supplied to timer 126, which signals control unit 60 after it times out.

The bit selection portion of the display control words stored in ROM 102 at address 00010 causes selector 104 to select the intermediate bit memory 106. The on/off selection portion causes switch 148 to open and switch 118 to close. Control unit 60 causes row shift register 122 to close switch 124A and transfers the intermediate bits for the first row of pixels for the red component of the image to column shift register 106. After the turn-on time and safety factor, control unit 60 causes shift register 122 to close switch 124B and transfers the intermediate bits for the second row to column shift register 106. This procedure continues for all of the intermediate bits. When the last row is displayed, counter 100 is incremented to provide the address signal 00011 to ROM 102. The color selection portion of the display control words stored at this address causes selector 128 to again select red flash tubes 16 and 28. The light level portion causes quenching circuit 146 to stop the flash after the total amount of light emitted is half of the total amount emitted when the most significant bits were displayed. All of the pixels of panel 10 are then turned off in the manner previously discussed and control unit 60 shifts a "1" through row shift register 122 while transferring the least significant bits for the red component of the image from memory 98 to column shift register 106. After all of the pixels of panel 10 corresponding to least significant bits have been turned on, red flash tubes 20 and 32 are flashed for a predetermined period during which the total quantity of light emitted is half of the total quantity emitted when the intermediate bits were displayed and one-fourth of the total quantity emitted when the most significant bits were displayed. The term "total quantity" is intended here to mean the intensity or brightness of a flash integrated over its duration.

In general the light level portion of the display control word during the flash for the most significant bits sets a longer flash duration than the light level portion during the flash for the intermediate bits, and the light level portion for the intermediate bits sets a longer flash duration than the light level portion for the least significant bits. This does not mean, however, that the flash for the most significant bits is twice as long as the flash for the intermediate bits and that the flash for the intermediate bits is twice as long as the flash for the least significant bits. The reason is that the intensity of the light emitted from a flash tube during a flash is typically not constant. The light level portions are determined by experiment so that the total quantity of light during a flash for the intermediate bits is twice that for a flash for the least significant bits and half that for the flash for the most significant bits.

After the red component of the image has been displayed, control unit 60 transfers the content of memory 64 for the green component of the image to memories 94–98. The most significant bits, intermediate bits, and least significant bits are read out and displayed in the manner that was discussed above for the red component of the image. After the green component has been displayed, control unit 60 transfers the blue component from memory 66 to memories 94–98. After the blue component has been displayed, counter 100 is reset to 00000 and the cycle begins again, with the red component of the next frame being transferred to memories 94–98. Table I shows the content of ROM 102 during the display of an entire frame. Control unit 60 resets counter 100 to 00000 when its content reaches 10010.

TABLE I

| Address | Bit Selection Portion | DISPLAY CONTROL WORDS Light Level Portion | On/Off Selection Portion | Color Selection Portion |
|---|---|---|---|---|
| 00000 | 01 (Memory 94) | X (Don't care) | 1 (Switch 118 closed) | 11 (No selection) |
| 00001 | 01 (Memory 94) | Number setting duration of high level flash | 0 (Switch 148 closed) | 00 (Red) |
| 00010 | 10 (Memory 96) | X (Don't care) | 1 (Switch 118 closed) | 11 (No selection) |
| 00011 | 10 (Memory 96) | Number setting duration of medium level flash | 0 (Switch 148 closed) | 00 (Red) |
| 00100 | 11 (Memory 98) | X (Don't care) | 1 (Switch 118 closed) | 11 (No selection) |
| 00101 | 11 (Memory 98) | Number setting duration of low level flash | 0 (Switch 148 closed) | 00 (Red) |
| 00110 | 01 (Memory 94) | X (Don't care) | 1 (Switch 118 closed) | 11 (No selection) |
| 00111 | 01 (Memory 94) | Number setting duration of high level flash | 0 (Switch 148 closed) | 01 (Green) |
| 01000 | 10 (Memory 96) | X (Don't care) | 1 (Switch 118 closed) | 11 (No selection) |
| 01001 | 10 (Memory 96) | Number setting duration of medium level flash | 0 (Switch 148 closed) | 01 (Green) |
| 01010 | 11 (Memory 98) | X (Don't care) | 1 (Switch 118 closed) | 11 (No selection) |
| 01011 | 11 (Memory 98) | Number setting duration of low level flash | 0 (Switch 148 closed) | 01 (Green) |
| 01100 | 00 (Memory 94) | X (Don't care) | 1 (Switch 118 closed) | 11 (No selection) |
| 01101 | 00 (Memory 94) | Number setting duration of high level flash | 0 (Switch 148 closed) | 10 (Blue) |
| 01110 | 01 (Memory 96) | X (Don't care) | 1 (Switch 118 closed) | 11 (No selection) |
| 01111 | 01 (Memory 96) | Number setting duration of medium level flash | 0 (Switch 148 closed) | 10 (Blue) |
| 10000 | 11 (Memory 98) | X (Don't care) | 1 (Switch 118 closed) | 11 (No selection) |
| 10001 | 11 (Memory 98) | Number setting duration of low level flash | 0 (Switch 148 closed) | 10 (Blue) |
| 10010 | X (Don't care) | X (Don't care) | X (Don't care) | 11 (No selection) |

While the foregoing discussion has described the liquid crystal display apparatus of the present invention using an example in which the red component of a frame is displayed first, followed by the green and blue components, and for each component the most significant bit is displayed first, followed by the intermediate significant bit and the least significant bit, it will be apparent that this sequence is not a necessary one. For example, the least significant bit of the green component could be displayed first, followed by the most significant bit of the green component, followed by the intermediate bit of the green component, followed by the intermediate bit of the red component, followed by the most significant bit of the red component, and so forth until all bits of all components are displayed. It is not even necessary to display all bits of one color before proceeding to the next color.

Figure 4:
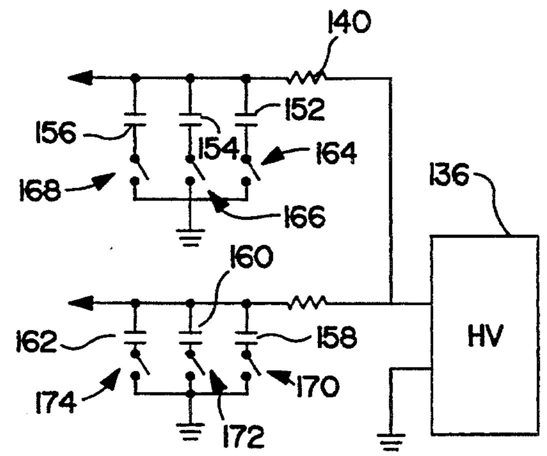
FIG. 4 is a schematic diagram illustrating a modification of an arrangement for driving flash tubes in the backlighting unit.

FIG. 4 illustrates a portion of an alternative embodiment in which capacitor 138 is replaced by capacitors 152, 154, and 156 and capacitor 142 is replaced by capacitors 158, 160, and 162. These capacitors can be connected to ground by electrically controlled switches 164–174. Timer 126 and quench circuit 146 are unnecessary. Since timer 126 is not needed in this alternative embodiment, the trigger signal from trigger unit 132 is supplied to control unit 60, which then delays for a predetermined period (which is set to be longer than the longest flash) before shifting a "1" through row shift register 122 again and transferring new bits to column shift register 106.

The energy stored by capacitor is one-half the capacitance times the voltage across the capacitor, squared. In the arrangement shown in FIG. 4, capacitors 152 and 158 store energy for use during the flashes for the most significant bits. Capacitors 154 and 160 store energy for use during the flashes for the intermediate significant bits. Capacitors 156 and 162 store energy for the flashes for the least significant bits. The capacitance of capacitors 152 and 158 is four times the capacitance of capacitors 156 and 162 and twice the capacitance of capacitors 154 and 160. The light level portion of the display control words in this alternative embodiment causes switches 164 and 170 to close while the pixels of panel 10 are being turned on in accordance with the most significant bits of a color component, and during the preceding period while pixels were being turned off. The light level portion causes switches 166 and 172 to be closed while pixels corresponding to the intermediate bits are being turned on, and during the preceding period while pixels were being turned off. Similarly, switches 168 and 174 are closed while pixels for the least significant bit are being turned on and during the preceding turn-off period.

In a modification of the embodiment of FIG. 4, capacitors 156 and 162 have the same capacitance as capacitors 154 and 160, and capacitors 152 and 158 have twice this capacitance. Different combinations of switches are closed to determine the power of a flash. For example, during the flash for the most significant bits, all of the switches would be closed.

In another embodiment, not illustrated, separate voltage sources are used for the flashes for each bit.

In the embodiments discussed above, the video words for the red, green, and blue components have three bits. This number of bits was selected to facilitate the explanation of the invention, but it will be apparent that the arrangement shown in FIG. 3 can readily be modified to accommodate more bits. For example, if four bits were used for the video words, the pixels of panel 10 would be turned on in accordance with the various bit ranks four times for each color component, and four flashes at different levels would be emitted.

At this point, a rough computation of the performance of a liquid crystal display apparatus in accordance with the present invention can be presented to illustrate the advantages of the invention. A very conservative estimate of the turn-on time and the turn-off time for a ferroelectric liquid crystal cell is one microsecond each. Another very conservative estimate would be that half of each second would be devoted to turning the cells on and off and the other half would be absorbed by miscellaneous overhead and delays, including a safety factor while "1" is shifted through row shift register 122. Then 500,000 microseconds is equal to 2 microseconds per row times the number R of rows times the number B of bits in each video word times 3 primary colors times the frame repetition rate F. Assuming a frame repetition rate F of 25 frames per second, the product of the number of rows R times the numbers of bits B is 3333. Thus, one can achieve an eight bit resolution with over 400 rows, or over 500 rows with a six bit resolution, even in this conservative example. More realistic values of the turn-on and turn-off time and the overhead would produce even better results.

In the foregoing embodiments, pixels of the LCD panel are turned on in accordance with bits of a particular significance or rank, and the light through the turn-on pixels is controlled by emitting a flash having a level corresponding to the rank of the bits. Then the pixels are turned off. The next embodiment will demonstrate two further techniques for controlling the total amount of light passing through the turned-on pixels.

To explain these techniques, in the next embodiment it will be assumed that the video data words for the red, green, and blue components of the image have four bits. An LCD driver unit similar to the one shown in FIG. 3, but having an additional intermediate bit memory for the third-most significant bit of each word, would be used. Furthermore, the backlighting unit in this embodiment employs fluorescent tubes rather than flash tubes as in the previous embodiments.

Figure 5:
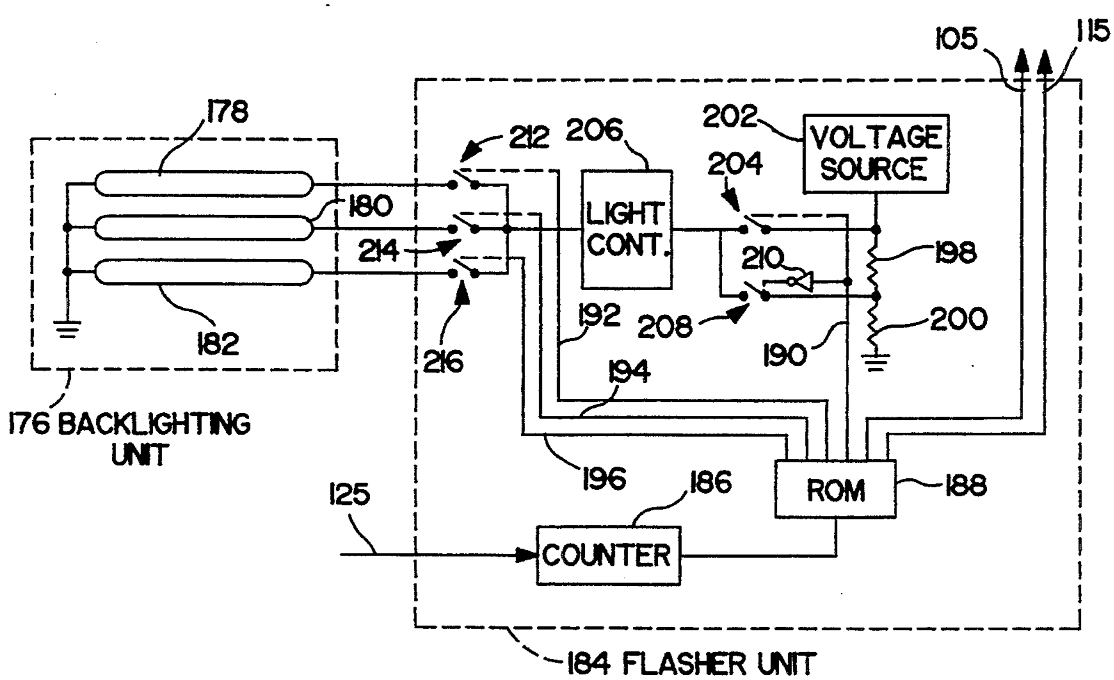
FIG. 5 is a block diagram showing the backlighting unit and flasher unit in another embodiment.

In FIG. 5, a backlighting unit 176 includes a fluorescent tube 178 which emits red light, a fluorescent tube 180 which emits green light, and a fluorescent tube 182 which emits blue light. Although only one group of three fluorescent tubes is shown in FIG. 5, it will be apparent that additional groups would be desirable so that, in conjunction with a diffusion plate, the light of any particular color falls evenly on the back side of LCD panel 10.

A flasher unit 184 receives a signal via conductor 125 from the last stage of row shift register 122. A counter 186 is cleared to 00000 each time a frame is completed, before display of the red component (for example) of the next frame begins. Counter 186 is incremented each time "1" is shifted into the last stage of row shift register 122. The content of counter 186 provides an address signal for a ROM 188, which stores display control words. Each display control word includes a one-bit on/off selection portion which is supplied via conductor 115 to switch 118 and (in inverted form) to switch 148. Each display control word also includes a two-bit bit selection portion which is supplied, via conductors 105, to selector 104. In this embodiment, each display control word also includes a one-bit light level portion which is supplied to a conductor 190. Instead of a binary color selection portion, in this embodiment the color selection portion has three bits, each of the bits determining whether or not a corresponding fluorescent tube is on or off. ROM 188 supplies the three bits of the color selection portion on conductors 192, 194, and 196.

A voltage divider which includes resistors 198 and 200 is connected between a voltage source 202 and ground. Resistor 198 has three times the resistance value as resistor 200, so that the potential between them is one-fourth that of voltage source 202. An electrically controlled switch 204 is connected between voltage source 202 and the input port of a light controller 206. An electrically controlled switch 208 is connected between the input port and the junction between resistors 198 and 200. An inverter 210 causes switch 208 to close if the potential on conductor 190 is "0." If the potential on conductor 190 is "1," switch 204 closes. Light controller 206 controls the intensity of a fluorescent tube in response to the potential at its input port, by varying the duty cycle in response to the potential.

An electrically controlled switch 212 connects red fluorescent tube 178 to the output of light controller 206 if the potential on line 192 is "1." An electrically controlled switch 214 connects green fluorescent tube 180 to the output of light controller 206 if the potential on connector 194 is "1." An electrically controlled switch 216 connects blue flash tube 182 to the output of light controller 206 if the potential on conductor 196 is "1."

In the embodiment shown in FIG. 3, the pixels of the first row are selectively turned on before the pixels of the last row, but the time between the turning on and the turning off of the pixels of the first row is the same as the time between the turning on and the turning off of the pixels of the last row. Consequently, if the back side of panel 10 is steadily exposed to light of some desired intensity between the time the selected pixels of the first row are turned on and the time the selected pixels of the last row are turned off, the same total amount of light will pass through each of the pixels that have been turned on during this interval. When pixels are later turned on in accordance with bits of a different rank, the total amount of light through each pixel can be adjusted by adjusting the intensity of the backlighting during the interval while the pixels are being turned on and off. This technique is one of those used in the embodiment of FIG. 5.

Also, if the back of panel 10 is steadily illuminated between the time when the pixels of the first row are selectively turned on and the pixels of the last row are selectively turned off, the total amount of light through each pixel depends on the frequency at which row shift register 122 is clocked. If care is taken to ensure that the period between the shifting of "1" out of the last stage and the shifting "1" into the first stage is the same as the period for shifting "1" from stage-to-stage, the light through each pixel doubles when the shifting frequency is halved.

Returning to FIG. 5, the display control word at address 00000 of ROM 188 causes selector 104 to select the least significant bit of the video words for the red component of the image. The ON/off selection portion causes switch 118 to connect the on source 120 to conductor 114. The color selection portion causes switch 212 to connect red fluorescent tube 178 to the output of control unit 60 to first turn the pixels selectively on and to then turn them off. However, the shifting frequency of shift register 122 is half the shifting frequency that was used when bits were being turned on and off in accordance with the least significant bits of the video words, so the total amount of light through each pixel is doubled when they are on and off in accordance with the third-most significant bits.

This progressive halving of the shifting frequency could continue for higher order bits, but it will be apparent that the shifting frequency would become impractically low if the video words have an appreciable number of bits. For the second-most significant bit and the most significant bit, in the present embodiment the intensity of the light emitted by red flash tube 178 is quadrupled by opening switch 208 and closing switch 204. For the second-most significant bit, shift register 122 is clocked at the first or high frequency and for the most significant bit it is clocked at the second or low frequency. After the red component of a frame has been displayed, the green and blue components are displayed in the same way. Control unit 60 resets counter 186 to 00000 after the most significant bit of the blue component has been displayed.

Table II illustrates the content of ROM 188 in this embodiment. Table II also includes a column marked "frequency," and this refers to the shifting frequency of row shift register 122. The frequency marked "H" is twice that marked "L."

TABLE II

| Row Shift Register Shifting Frequency | Address | DISPLAY CONTROL WORDS | | | | | |
|---|---|---|---|---|---|---|---|
| | | Bit Selection Portion | Light Level Portion | On/Off Selection Portion | Color Selection Portion (Red) | (Green) | (Blue) |
| H | 00000 | 00 | 0 | 1 | 1 | 0 | 0 |
| H | 00001 | 00 | 0 | 0 | 1 | 0 | 0 |
| L | 00010 | 01 | 0 | 1 | 1 | 0 | 0 |
| L | 00011 | 01 | 0 | 0 | 1 | 0 | 0 |
| H | 00100 | 00 | 0 | 1 | 0 | 1 | 0 |
| H | 00101 | 00 | 0 | 0 | 0 | 1 | 0 |
| L | 00110 | 01 | 0 | 1 | 0 | 1 | 0 |
| L | 00111 | 01 | 0 | 0 | 0 | 1 | 0 |
| H | 01000 | 00 | 0 | 1 | 0 | 0 | 1 |
| H | 01001 | 00 | 0 | 0 | 0 | 0 | 1 |
| L | 01010 | 01 | 0 | 1 | 0 | 0 | 1 |
| L | 01011 | 01 | 0 | 0 | 0 | 0 | 1 |
| H | 01100 | 10 | 1 | 1 | 1 | 0 | 0 |
| H | 01101 | 10 | 1 | 0 | 1 | 0 | 0 |
| L | 01110 | 11 | 1 | 1 | 1 | 0 | 0 |
| L | 01111 | 11 | 1 | 0 | 1 | 0 | 0 |
| H | 10000 | 10 | 1 | 1 | 0 | 1 | 0 |
| H | 10001 | 10 | 1 | 0 | 0 | 1 | 1 |
| L | 10010 | 11 | 1 | 1 | 0 | 1 | 0 |
| L | 10011 | 11 | 1 | 0 | 0 | 1 | 0 |
| H | 10100 | 10 | 1 | 1 | 0 | 0 | 1 |
| H | 10101 | 10 | 1 | 0 | 0 | 0 | 1 |
| L | 10110 | 11 | 1 | 1 | 0 | 0 | 1 |
| L | 10111 | 11 | 1 | 0 | 0 | 0 | 1 |

light controller 206. Finally, the light level portion causes switch 208 to close, thus applying a reduced voltage to the input port of light controller 206. Shift register 122 is clocked at a relatively high frequency while the pixels are turned on and off in accordance with the least significant bit and the back of panel 10 is continuously exposed to relatively low intensity light from fluorescent tube 178. Immediately after the pixels have been turned off, selector 104 selects the third-most significant bit of the video words for the red component. Switches 118, 208, and 212 are again closed, and the back of panel 10 continuously receives relatively low intensity light while shift register 122 is driven by In FIG. 5, elements 198–202, 204, 208, and 210 function to transform a one-bit digital signal to an analog signal that is supplied to the input port of light controller 206. In a modification of the FIG. 5 embodiment, the above-noted elements could be replaced by a digital-to-analog converter (not illustrated) if the light level portion of the display control word is expanded to have a number of bits instead of just one. The bits of the expanded light level portion would form a binary number designating the desired intensity of illumination.

In another modification, not illustrated, a further electrically controlled switch (not illustrated) is connected between the input of light controller 206 on the one hand and switches 204 and 208 on the other hand. When pixels are being turned on and off in accordance with the least significant bit, switch 208 is closed and control unit 60 closes the further electrically controlled switch when any even-numbered stage of row shift register 122 contains a "1." When pixels are being turned on and off in accordance with the third-most significant bit, switch 208 is closed and control unit 60 closes the further electrically controlled switch continuously. When pixels are being turned on and off in accordance with the second-most significant bit, switch 204 is closed and control unit 60 closes the further electrically controlled switch when any even-numbered stage of row shift register 122 contains a "1." Finally, when pixels are being turned on and off in accordance with the most significant bit, switch 204 is closed and control unit 60 closes the further electrically controlled switch continuously. It will be seen that this approach provides four intensity levels—full intensity, half intensity, quarter intensity, and eighth intensity. One could dispense with switches 204 and 208 and the voltage divider by turning on the illumination when every eighth stage of row shift register 122 contains a "1," then when every fourth stage contains a "1," then when every other stage contains a "1," and then continuously. This would also give four binary intensity stages.

It will be understood that the above description of the present invention is susceptible to various modifications, changes and adaptations, and the same are intended to be comprehended within the meaning and range of equivalents of the appended claims.

What I claim is:

1. A method of displaying a sequence of frames of video information on a ferroelectric LCD panel having a matrix of pixels, the video information for a frame including a plurality of multi-bit video words, each video word corresponding to a respective pixel and including at least a first bit and a second bit, said method comprising the steps of:

(a) turning on the pixels which correspond to video words whose first bit has a predetermined value, by subjecting the pixels which correspond to video words whose first bit has the predetermined value to a voltage v-on while keeping pixels which correspond to video words whose first bit does not have the predetermined value isolated from the voltage v-on;

(b) turning off the pixels that were turned on during step (a), by subjecting the pixels which correspond to video words whose first bit has the predetermined value to a voltage v-off while keeping pixels which correspond to video words whose first bit does not have the predetermined value isolated from the voltage v-off;

(c) turning on the pixels which correspond to video words whose second bit has the predetermined value, by subjecting the pixels which correspond to video words whose second bit has the predetermined value to the voltage v-on while keeping pixels which correspond to video words whose second bit does not have the predetermined value isolated from the voltage v-on; and (d) turning off the pixels that were turned on during step (c), by subjecting the pixels which correspond to video words whose second bit has the predetermined value to the voltage v-off while keeping pixels which correspond to video words whose second bit does not have the predetermined value isolated from the voltage v-off.

2. The method of claim 1, wherein the LCD panel has a plurality of row electrodes and a plurality of column electrodes, and wherein step (a) comprises:

(a-1) transferring the first bits of the video words corresponding to the pixels in a first row to a column shift register having a plurality of stages;

(a-2) selectively connecting the column electrodes to an ON voltage source depending on the content of the stages of the column shift register;

(a-3) bringing the first of the row electrodes to a predetermined potential;

(a-4) transferring the first bits of the video words corresponding to the pixels in the next row to the column shift register;

(a-5) selectively connecting the column electrodes to the ON voltage source depending on the content of the stages of the column shift register;

(a-6) bring the next row electrode to the predetermined potential; and (a-7) repeating steps (a-4) to (a-6) until the last row electrode has been brought to the predetermined potential.

3. The method of claim 2, wherein the predetermined potential is ground potential, wherein step (a-3) is conducted by bringing the first of the row electrodes to ground potential while the rest of the row electrodes are in an electrically floating state, and wherein step (a-6) is conducted by bringing the next row electrode to ground potential while the rest of the row electrodes are in an electrically floating state.

4. The method of claim 2, wherein step (b) comprises:

(b-1) transferring the first bits of the video words corresponding to the pixels in the first row to the column shift register;

(b-2) selectively connecting the column electrodes to an OFF voltage source depending on the content of the stages of the column shift register;

(b-3) bringing the first of the row electrodes to the predetermined potential;

(b-4) transferring the first bits of the video words corresponding to pixels in the next row to the column shift register;

(b-5) selectively connecting the column electrodes to the OFF voltage source depending on the contents of the stages of the column shift register;

(b-6) bringing the next row electrode to the predetermined potential; and (b-7) repeating steps (b-4) to (b-6) until the last row electrode has been brought to the predetermined potential.

5. The method of claim 4, wherein step (c) comprises:

(c-1) transferring the second bits of the video words corresponding to the pixels in the first row to the column shift register;

(c-2) selectively connecting the column electrodes to the ON voltage source depending on the content of the stages of the column shift register;

(c-3) bringing the first of the row electrodes to the predetermined potential;

(c-4) transferring the second bits of the video words corresponding to the pixels in the next row to the column shift register;

(c-5) selectively connecting the column electrodes to the ON voltage source depending on the content of the stages of the column shift register;

(c-6) bringing the next row electrode to the predetermined potential; and (c-7) repeating steps (c-4) to (c-6) until the last row electrode has been brought to the predetermined level.

6. The method of claim 1, further comprising the steps of exposing the panel to a flash of light at a first level after step (a) is conducted, and exposing the panel to a flash of light at a second level after step (c) is conducted.

7. The method of claim 6, wherein the step of exposing the panel to a flash of light at a first level comprises charging a capacitor to a predetermined potential, and discharging the capacitor through an illuminating source for a first predetermined duration, and wherein the step of exposing the panel to a flash of light at a second level comprises charging the capacitor to the predetermined potential, and discharging the capacitor through the illuminating source for a second predetermined duration.

8. The method of claim 6, wherein the step of exposing the panel to a flash of light at a first level comprises storing a first amount of energy, and discharging the stored energy through an illuminating source, and wherein the step of exposing the panel to a flash of light at a second level comprises storing a second amount of energy, and discharging the stored energy through the illuminating source.

9. The method of claim 1, further comprising the steps of steadily exposing the panel to light at a first level while steps (a) and (b) are conducted, and steadily exposing the panel to light at a second level while steps (c) and (d) are conducted.

10. The method of claim 1, further comprising the steps of exposing the panel to light during at least one period while steps (a) and (b) are conducted, and exposing the panel to light during at least one period while steps (c) and (d) are conducted, the exposing steps being conducted so that the light while steps (a) and (b) are conducted has a different level than when steps (c) and (d) are conducted.

11. The method of claim 1, wherein steps (a) and (b) are conducted at a different rate than steps (c) and (d).

12. The method of claim 11, further comprising the step of steadily exposing the panel to light while steps (a) through (d) are conducted.

13. The method of claim 11, further comprising the step of exposing the panel to light at a constant level during at least one period while steps (a) through (d) are conducted.

14. A method of displaying a sequence of frames of video information on a ferroelectric LCD panel having a matrix of pixels, the video information for a frame including a plurality of first multi-bit video words for a first primary color component of an image, a plurality of second multi-bit video words for a second primary color component of the image, and a plurality of third multi-bit video words for a third primary color component of the image, each pixel corresponding to one of the first multi-bit video words, one of the second multi-bit video words, and one of the third multi-bit video words, each of the multi-bit video words including at least a most significant bit and a least significant bit, comprising:

(a) turning on the pixels which correspond to the first video words whose most significant bit has a predetermined value, by subjecting the pixels which correspond to first video words whose most significant bit has the predetermined value to a voltage v-on while keeping pixels which correspond to first video words whose most significant bit does not have the predetermined value isolated from the voltage v-on;

(b) turning off the pixels that were turned on during step (a), by subjecting the pixels which correspond to first video words whose most significant bit has the predetermined value to a voltage v-off while keeping pixels which correspond to first video words whose most significant bit does not have the predetermined value isolated from the voltage v-off;

(c) turning on the pixels which correspond to first video words whose least significant bit has the predetermined value, by subjecting the pixels which correspond to first video words whose least significant bit has the predetermined value to the voltage v-on while keeping pixels which correspond to first video words whose least significant bit does not have the predetermined value isolated from the voltage v-on; and (d) turning off the pixels that were turned on during step (c), by subjecting the pixels which correspond to first video words whose least significant bit has the predetermined value to the voltage v-off while keeping pixels which correspond to first video words whose least significant bit does not have the predetermined value isolated from the voltage v-off.

15. The method of claim 14, further comprising the steps of:

(e) turning on the pixels which correspond to second video words whose most significant bit has the predetermined value, by subjecting the pixels which correspond to second video words whose most significant bit has the predetermined value to the voltage v-on while keeping pixels which correspond to second video words whose most significant bit does not have the predetermined value isolated from the voltage v-on;

(f) turning off the pixels that were turned on during step (e), by subjecting the pixels which correspond to second video words whose most significant bit has the predetermined value to the voltage v-off while keeping pixels which correspond to second video words whose most significant bit does not have the predetermined value isolated from the voltage v-off;

(g) turning on the pixels which correspond to second video words whose least significant bit has the predetermined value, by subjecting the pixels which correspond to second video words whose least significant bit has the predetermined value to the voltage v-on while keeping pixels which correspond to second video words whose least significant bit does not have the predetermined value isolated from the voltage v-on; and (h) turning off the pixels that were turned on during step (g), by subjecting the pixels which correspond to second video words whose least significant bit has the predetermined value to the voltage v-off while keeping pixels which correspond to second video words whose least significant bit does not have the predetermined value isolated from the voltage v-off.

16. The method of claim 15, further comprising the steps of:

(i) turning on the pixels which correspond to third video words whose most significant bit has the predetermined value, by subjecting the pixels which correspond to third video words whose most significant bit has the predetermined value to the voltage v-on while keeping pixels which correspond to third video words whose most significant bit does not have the predetermined value isolated from the voltage v-on;

(j) turning off the pixels that were turned on during step (i), by subjecting the pixels which correspond to third video words whose most significant bit has the predetermined value to the voltage v-off while keeping pixels which correspond to third video words whose most significant bit does not have the predetermined value isolated from the voltage v-off;

(k) turning on the pixels which correspond to third video words whose least significant bit has the predetermined value, by subjecting the pixels which correspond to third video words whose least significant bit has the predetermined value to the voltage v-on while keeping pixels which correspond to third video words whose least significant bit does not have the predetermined value isolated from the voltage v-on; and (l) turning off the pixels that were turned on during step (k), by subjecting the pixels which correspond to third video words whose least significant bit has the predetermined value to the voltage v-off while keeping pixels which correspond to third video words whose least significant bit does not have the predetermined value isolated from the voltage v-off.

17. The method of claim 14, further comprising the steps of exposing the panel to a first flash of light at a first level after step (a) is conducted, the first flash having the first primary color, and exposing the panel to a second flash of light at a second level after step (c) is conducted, the second flash having the first primary color.

18. The method of claim 14, further comprising the steps of steadily exposing the panel to light at a first level while steps (a) and (b) are conducted, and steadily exposing the panel to light at a second level while steps (c) and (d) are conducted, the light at the first level and the light at the second level having the first primary color.

19. The method of claim 14, further comprising the steps of exposing the panel to light during at least one period while steps (a) and (b) are conducted, and exposing the panel to light during at least one period while steps (c) and (d) are conducted, the exposing steps being conducted so that the light while steps (a) and (b) are conducted has a different level than when steps (c) and (d) are conducted, the exposing steps being conducted with light of the first primary color.

20. The method of claim 14, wherein steps (a) and (b) are conducted at a slower rate than steps (c) and (d).

21. A method of displaying a sequence of frames of video information on a ferroelectric LCD panel having a matrix of pixels, the video information for a frame including a plurality of multi-bit video words, each video word corresponding to a respective pixel and including at least a first bit and a second bit, said method comprising the steps of:

(a) turning on the pixels which correspond to video words whose first bit has a predetermined value;

(b) turning off the pixels that were turned on during step (a);

(c) turning on the pixels which correspond to video words whose second bit has the predetermined value;

(d) turning off the pixels that were turned on during step (c);

(e) steadily exposing the panel to light at a first level while step (a) is conducted and while step (b) is conducted; and (f) steadily exposing the panel to light at a second level while step (c) is conducted and while step (d) is conducted.

22. A method of displaying a sequence of frames of video information on a ferroelectric LCD panel having a matrix of pixels, the video information for a frame including a plurality of multi-bit video words, each video word corresponding to a respective pixel and including at least a first bit and a second bit, said method comprising the steps of:

(a) turning on the pixels which correspond to video words whose first bit has a predetermined value;

(b) turning off the pixels that were turned on during step (a);

(c) turning on the pixels which correspond to video words whose second bit has the predetermined value; and (d) turning off the pixels that were turned on during step (c), wherein steps (a) and (b) are conducted at a different rate than steps (c) and (d).

23. The method of claim 22, further comprising the step of steadily exposing the panel to light while steps (a) through (d) are conducted.

24. The method of claim 22, further comprising the step of exposing the panel to light for at least one period while step (a) is conducted, for at least one period while step (b) is conducted, for at least one period while step (c) is conducted, and for at least one period while step (d) is conducted.

25. A method of displaying a sequence of frames of video information on a ferroelectric LCD panel having a matrix of pixels, the video information for a frame including a plurality of first multi-bit video words for a first primary color component of an image, a plurality of second multi-bit video words for a second primary color component of the image, and a plurality of third multi-bit video words for a third primary color component of the image, each pixel corresponding to one of the first multi-bit video words, one of the second multi-bit video words, and one of the third multi-bit video words, each of the multi-bit video words including at least a most significant bit and a first intermediate bit with half the binary significance of the most significant bit, comprising:

(a) turning on the pixels which correspond to the first video words whose most significant bit has a predetermined value;

(b) turning off the pixels that were turned on during step (a);

(c) turning on the pixels which correspond to first video words whose first intermediate bit has the predetermined value;

(d) turning off the pixels that were turned on during step (c);

(e) exposing the panel to light of the first primary color while steps (a)-(d) are conducted;

(f) turning on the pixels which correspond to second video words whose most significant bit has the predetermined value;

(g) turning off the pixels that were turned on during step (f);

(h) turning on the pixels which correspond to second video words whose first intermediate bit has the predetermined value;

(i) turning off the pixels that were turned on during step (h);

(j) exposing the panel to light of the second primary color while steps (f)–(i) are conducted;

(k) turning on the pixels which correspond to third video words whose most significant bit has the predetermined value;

(l) turning off the pixels that were turned on during step (k);

(m) turning on the pixels which correspond to third video words whose first intermediate bit has the predetermined value; and (n) turning off the pixels that were turned on during step (m), wherein step (e) is conducted by steadily exposing the panel to light at a high level during step (a) and during step (b), and by steadily exposing the panel to light at half the high level during step (c) and during step (d).

26. A method of displaying a sequence of frames of video information on a ferroelectric LCD panel having a matrix of pixels, the video information for a frame including a plurality of first multi-bit video words for a first primary color component of an image, a plurality of second multi-bit video words for a second primary color component of the image, and a plurality of third multi-bit video words for a third primary color component of the image, each pixel corresponding to one of the first multi-bit video words, one of the second multi-bit video words, and one of the third multi-bit video words, each of the multi-bit video words including at least a most significant bit and a first intermediate bit with half the binary significance of the most significant bit, comprising:

(a) turning on the pixels which correspond to the first video words whose most significant bit has a predetermined value;

(b) turning off the pixels that were turned on during step (a);

(c) turning on the pixels which correspond to first video words whose first intermediate bit has the predetermined value;

(d) turning off the pixels that were turned on during step (c);

(e) exposing the panel to light of the first primary color while steps (a)–(d) are conducted;

(f) turning on the pixels which correspond to second video words whose most significant bit has the predetermined value;

(g) turning off the pixels that were turned on during step (f);

(h) turning on the pixels which correspond to second video words whose first intermediate bit has the predetermined value;

(i) turning off the pixels that were turned on during step (h);

(j) exposing the panel to light of the second primary color while steps (f)–(i) are conducted;

(k) turning on the pixels which correspond to third video words whose most significant bit has the predetermined value;

(l) turning off the pixels that were turned on during step (k);

(m) turning on the pixels which correspond to third video words whose first intermediate bit has the predetermined value; and (n) turning off the pixels that were turned on during step (m), wherein step (e) is conducted by exposing the panel to light for at least one period during step (a), at least one period during step (b), at least one period during step (c), and at least one period during step (d), the total amount of light received by the panel during steps (a) and (b) being double the total amount of light received by the panel during steps (c) and (d).

27. A method of displaying a sequence of frames of video information on a ferroelectric LCD panel having a matrix of pixels, the video information for a frame including a plurality of first multi-bit video words for a first primary color component of an image, a plurality of second multi-bit video words for a second primary color component of the image, and a plurality of third multi-bit video words for a third primary color component of the image, each pixel corresponding to one of the first multi-bit video words, one of the second multi-bit video words, and one of the third multi-bit video words, each of the multi-bit video words including a most significant bit and a first intermediate bit with half the binary significance of the most significant bit, comprising:

(a) turning on the pixels which correspond to the first video words whose most significant bit has a predetermined value;

(b) turning off the pixels that were turned on during step (a);

(c) turning on the pixels which correspond to first video words whose first intermediate bit has the predetermined value;

(d) turning off the pixels that were turned on during step (c);

(e) turning on the pixels which correspond to second video words whose most significant bit has the predetermined value;

(f) turning off the pixels that were turned on during step (e);

(g) turning on the pixels which correspond to second video words whose first intermediate bit has the predetermined value;

(h) turning off the pixels that were turned on during step (g);

(i) turning on the pixels which correspond to third video words whose most significant bit has the predetermined value;

(j) turning off the pixels that were turned on during step (i);

(k) turning on the pixels which correspond to third video words whose first intermediate bit has the predetermined value; and (l) turning off the pixels that were turned on during step (k), wherein steps (a) and (b) are conducted half as fast as steps (c) and (d), steps (e) and (f) are conducted half as fast as steps (g) and (h), and steps (i) and (j) are conducted half as fast as steps (k) and (l).

28. The method of claim 27, wherein the panel is steadily exposed to light of the first primary color during steps (a)–(c), to light of the second primary color during steps (e)–(h), and light of the third primary color during steps (i)–(l) .

29. The method of claim 27, wherein the panel is exposed to light of the first primary color for at least one period during each of steps (a)–(c), to light of the second primary color for at least one period during each of steps (e)–(h), and to light of the third primary color for at least one period during each of steps (i)–(l).

* * * * *